(12) United States Patent
Kageyama et al.

(10) Patent No.: US 6,392,968 B1
(45) Date of Patent: May 21, 2002

(54) METHOD FOR REPRODUCING DATA INCLUDING JUDGING WHETHER SEAMLESS REPRODUCTION OF THE DATA IS POSSIBLE

(75) Inventors: Masahiro Kageyama, Hachioji; Tsukasa Hasegawa, Hiratsuka, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/343,723

(22) Filed: Jun. 30, 1999

(30) Foreign Application Priority Data

Jul. 3, 1998 (JP) .............................. 10-188521

(51) Int. Cl.[7] ................................. G11B 7/00
(52) U.S. Cl. ................ 369/47.13; 369/47.3; 369/47.33; 369/53.24
(58) Field of Search .................. 369/47.12–47.13, 369/47.23, 47.3, 47.33, 53.31, 53.22, 53.24

(56) References Cited

U.S. PATENT DOCUMENTS 5,469,560 A * 11/1995 Beglin
5,511,204 A * 4/1996 Crump et al.
5,586,093 A   12/1996 Honda et al.
5,995,461 A * 11/1999 Sedlmayr et al.
6,011,901 A *  1/2000 Kirsten

FOREIGN PATENT DOCUMENTS

| JP | 8-147878 | 6/1996 |
| JP | 9-251712 | 9/1997 |
| JP | 9-251717 | 9/1997 |
| JP | 9-251720 | 9/1997 |

* cited by examiner

*Primary Examiner*—W. R. Young
(74) *Attorney, Agent, or Firm*—Mattingly, Stanger & Malur, P.C.

(57) ABSTRACT

In order to keep the continuity in time of a reproducing operation, it is necessary to have contiguous physical recording of the data having over a predetermined quantity. However, there was a problem that the data fragmentation might be generated in copy type recording medium when the copy and that superscription continuity in time was not maintained. When judged whether the reproduction of the data with continuity in time is possible or not, before reproducing the data, and in the case of not, the data which was discontiguous is rearranged to be contiguous. According to this invention, the failure does not occur in the reproducing operation, even though the data fragmentation may be generated by the copy.

4 Claims, 7 Drawing Sheets

FIG. 1A

EXAMPLE OF REPRODUCING EQUIPMENT

FIG. 1B

EXAMPLE OF BUFFER OPERATION

FIG. 4A

EXAMPLE OF DATA CONFIGURATION ON RECORDING MEDIUM

FIG. 4B

| START ADDRESS | EXTENT LENGTH | |
|---|---|---|
| SA(1) | EL(1) | ← DATA(5-5) |
| SA(2) | EL(2) | ← DATA(5-6) |
| SA(3) | EL(3) | ← DATA(5-7) |
| SA(4) | EL(4) | ← DATA(5-8) |
| SA(5) | EL(5) | ← DATA(5-9) |
| SA(6) | EL(6) | ← DATA(5-10) |

EXAMPLE OF TABLE OF DATA CONFIGURATION

FIG. 4C

EXAMPLE OF BUFFER OPERATION

FIG. 5

| START ADDRESS SA(k) | EXTENT LENGTH EL(k) | DATA OCCUPANCY BEFORE RECORD Ds(k) | READOUT TIME Tr(k) | DATA OCCUPANCY AFTER RECORD De(k) | JUMP TIME Tj(k) |
|---|---|---|---|---|---|
| SA(1) | EL(1) | 0 | EL(1)/Vr | min(Deff, Ds(1)+(Vr−Vo)Tr(1)) | Tj(1) |
| SA(2) | EL(2) | De(1)−Vo·Tj(1) | EL(2)/Vr | min(Deff, Ds(2)+(Vr−Vo)Tr(2)) | Tj(2) |
| SA(3) | EL(3) | De(2)−Vo·Tj(2) | EL(3)/Vr | min(Deff, Ds(3)+(Vr−Vo)Tr(3)) | Tj(3) |
| SA(4) | EL(4) | De(3)−Vo·Tj(3) | EL(4)/Vr | min(Deff, Ds(4)+(Vr−Vo)Tr(4)) | Tj(4) |
| SA(5) | EL(5) | De(4)−Vo·Tj(4) | EL(5)/Vr | min(Deff, Ds(5)+(Vr−Vo)Tr(5)) | Tj(5) |
| SA(6) | EL(6) | De(5)−Vo·Tj(5) | EL(6)/Vr | min(Deff, Ds(6)+(Vr−Vo)Tr(6)) | Tj(6) |

↑ DATA IS PLACED SO THAT EACH Ds(k) MAY NOT CONSIST UNDER ZERO

↑ MIN(a, b) SHOWS WHICH IS NOT BIG WITH a AND b

METHOD FOR REPRODUCING DATA INCLUDING JUDGING WHETHER SEAMLESS REPRODUCTION OF THE DATA IS POSSIBLE

BACKGROUND OF THE INVENTION

This invention relates to recording and/or reproducing data. The present invention especially relates to recording and/or reproducing data which emphasizes the continuity in time of a reproducing operation for rewrittable recording medium.

For the rewrittable recording medium, it is popular to develop the method for recording and/or reproducing the data which emphasizes the continuity in times such as for image, voice, etc.

Generally, the seek operation to a desired address is slow in an optical disk medium like DVD-RAM, DVD-RW, etc., since the inertia of the movable parts, such as the optical pickup, is big. In the ZCLV (Zoned Constant Linear Velocity) system for using at DVD-RAM, the overhead is increased, and then the data access speed is comparatively slow, since the rotational frequency of the medium must be changed in every zone.

Figure 1A:
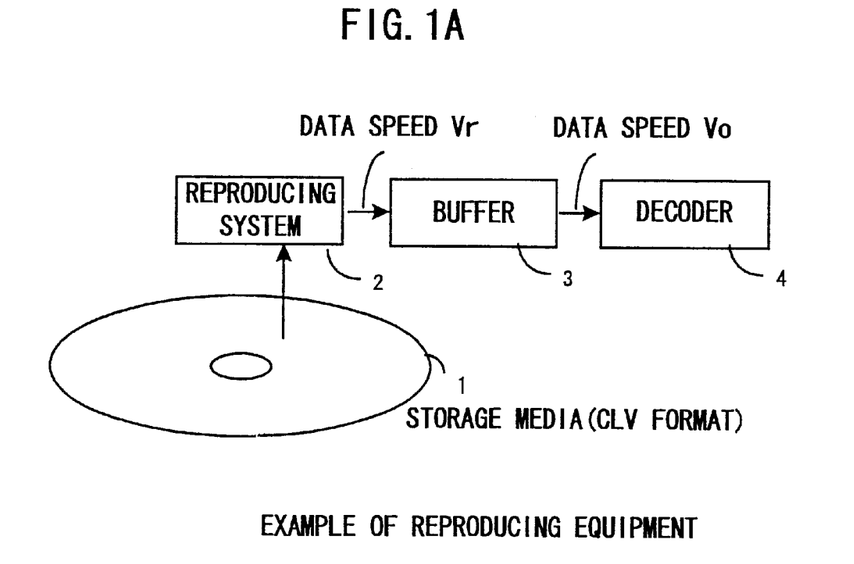
FIGS. 1A and 1B show views to explain the operations for recording and/or reproducing of the data.
Figure 1B:
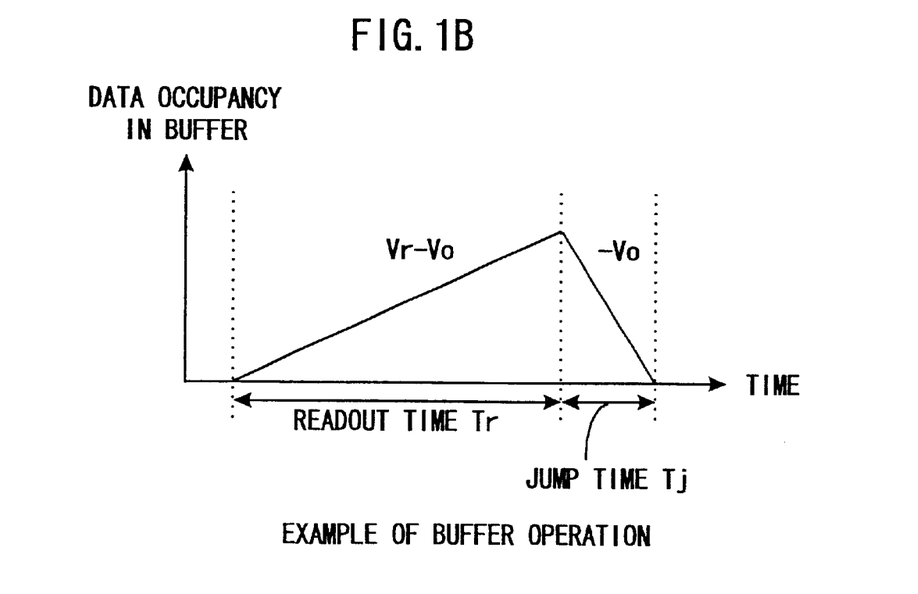

FIGS. 1A and 1B show a recording and/or reproducing method to be generally used in order to reproduce the data continuously in time by using the recording medium in which the data access speed is comparatively slow, wherein analysis is a part of the present invention.

At first, as shown in FIG. 1A, the data, which is read out through reproducing system 2 from the recording medium 1, is stored in buffer 3 at data readout speed Vr. In the meantime, when the data is read out from buffer 3, it is output at data reproducing speed Vo to a decoder 4.

As shown in FIG. 1B, in the time of Tr, during which data was read out from the recording medium, the data volume in the buffer increases at the speed of (Vr−Vo), and in the time of Tj when data can not be read out because of the jump (the seek+data volume in the buffer decreases at the speed of (−Vo). From the standard data speeds of Vr, Vo, and the worst jump time of Tj, the readout time of Tr needed to assure that the buffer does not empty during jump time, can be calculated from (Vr−Vo)Tr−Vo·Tj>0 with Tr>Tj·Vo/(Vr−Vo). It has been proven that the data volume over (Vr·Tr) must be written beforehand in contiguous addresses in order to reproduce the data continuously at the speed of Vr during the time of Tr. For example, when it is assumed Vr=11 Mbps, Vo=largest 8 Mbps, and Tj=1 second, Vr·Tr=11·1·8/(11−8)= 29.3 Mbit=3.7 MB and then the data volume over this amount must be written contiguously.

DESCRIPTION OF THE INVENTION

There was a problem to generate data fragmentation and not satisfy the regulation quantity (Vr·Tr) in the case when the data was copied in other recording medium, even if the data over the regulation quantity (Vr·Tr) was recorded beforehand and contiguously on the recording medium. This problem is explained by using FIGS. 2A and 2B.

Figure 2A:
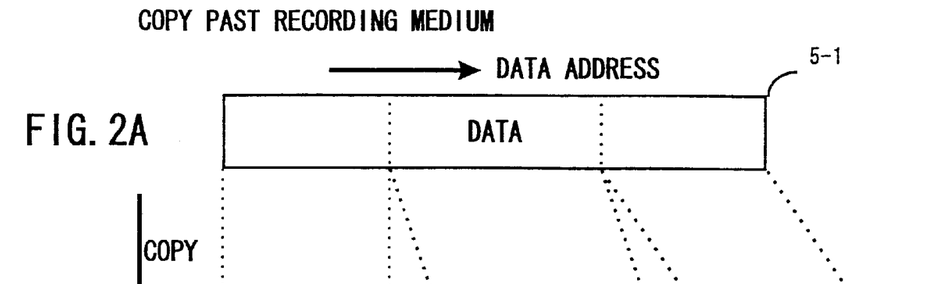
FIGS. 2A and 2B show a view to explain the problem to be solved by this invention.
Figure 2B:
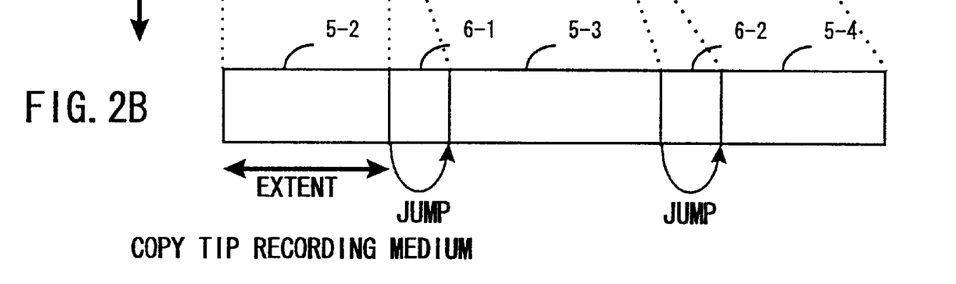

To begin with, it is assumed that the data (5-1) having a quantity over the regulation quantity (Vr·Tr) is recorded contiguously in a recording operation as shown in FIG. 2A. When the data is copied on the recording medium of FIG. 2B and other data (6-1, 6-2) has already used a part of the area, it is usual to record data (5-2, 5-3, 5-4) by avoiding the area of data 6-1, 6-2. This time, the length of the unit (extent) in which the data is recorded contiguously becomes decreased shorter than the aforesaid regulation quantity, and the data occupancy in the buffer shown at FIG. 1B became zero, when jump occurred over the areas (6-1, 6-2) and a reproducing operation became discontinuous in time.

Therefore, the object of this invention is to provide a method for recording and/or reproducing data which does not produce the above discontinuous reproducing failure, even if the data on the recording medium is copied in other recording medium, in the system which emphasizes the continuity in time of the reproducing operation.

Whether the data on the recording medium is able to reproduce continuously in time before reproducing or not is judged in order to achieve the aforesaid object, and the data is rearranged contiguously from the point of physical data allocation in the case of a judgement of not being able. The configuration in which the data is recorded physically contiguously is shown according to a flag, and the presence of the flag presents the data fragmentation being generated in the copy.

Or, the data is provided with a copy prohibition attribution in order to forbid copying itself.

Or, the data is read out, and the prohibition attribution is chosen.

Or, when judged whether the data was copied or not and then it was copied, the reproducing is stopped.

Or, the data is reproduced after it is rearranged, so that the data may be allocated physically contiguously from the point of physical data allocation.

BRIEF DESCRIPTION OF FIGURES

Further objects, features and advantages of the present invention will become more clear from the following detailed description of a preferred embodiment, described with respect to the accompanying drawing.

DESCRIPTION OF EMBODIMENTS

Embodiments of this invention are explained by using the drawing as follows.

In order not to produce the failure even if the data on the recording medium is copied in other recording medium, the method in which reproducing is normally possible even when data fragments by copying of the data, the method for forbidding copy itself, and the method for stopping reproducing after judged whether data was copied when data was a copy, are considered.

Figure 3:
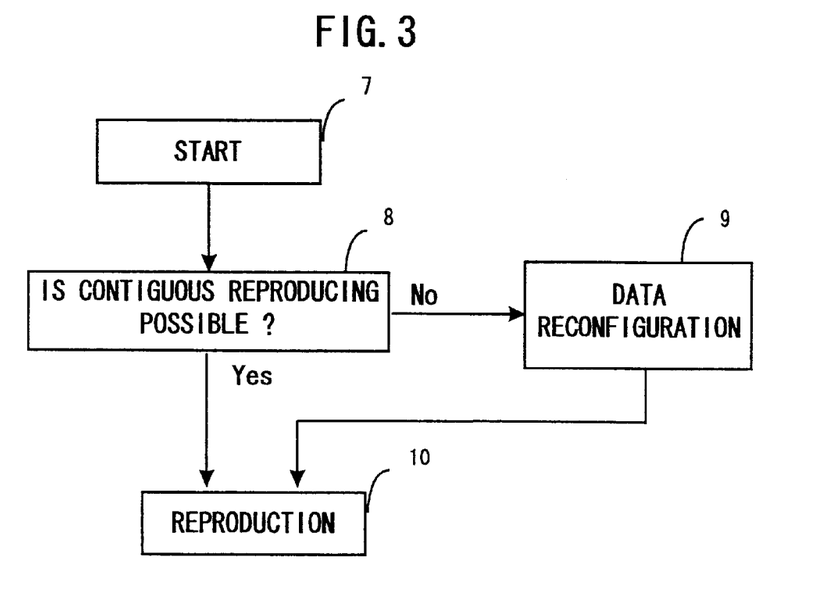
FIG. 3 shows an embodiment of this invention in which reproducing is normally possible, even if it fragments by copying the data.

In FIG. 3, an embodiment of this invention in which continuous reproducing is normally possible is shown, even if data fragments by the copying of the data. As shown in FIG. 3, after starting 7 and when judging whether it is impossible to reproduce seamlessly i.e. continuous or not, a usual reproducing operation 10 is done, when it was judged to be possible, and the reproducing operation 10 is done after performing data reconfiguration 9, when it was judged to be impossible. Here, the reproducing operation 10 is the operation which reproduces images and voice, etc. by a decoder, and the data is read out from the recording medium according to the procedure that is beforehand determined.

Especially, the starting 7 considers the cases of the power on, and in which the recording medium was inserted for the drive, etc.

Figure 4A:
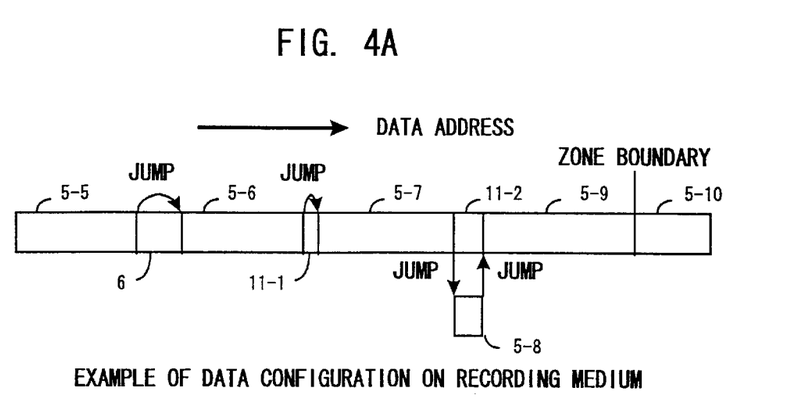
FIGS. 4A, 4B and 4C show an example of a decision method for whether the contiguous reproducing is possible or not.
Figure 4B:
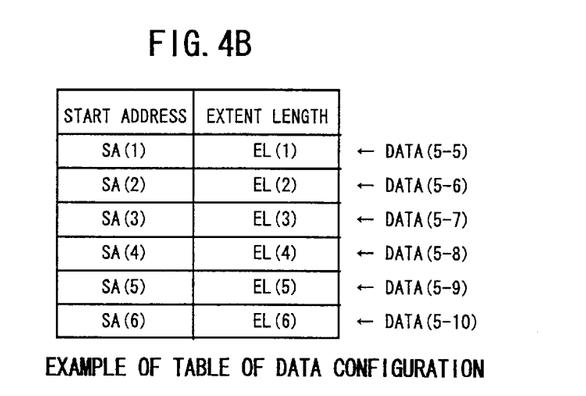
Figure 4C:
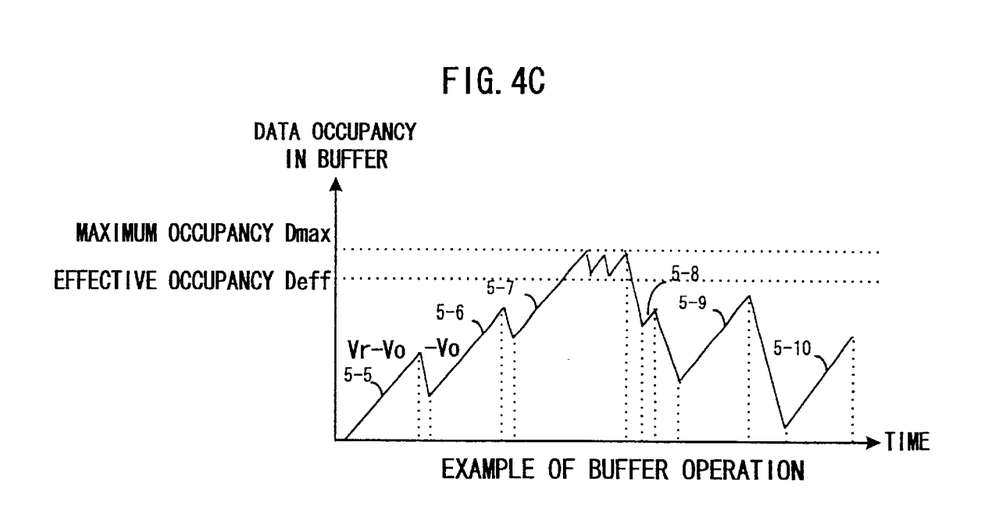

FIGS. 4A, 4B and 4C show an example of a decision for whether the contiguous reproducing is possible or not. To begin with, an example of data placement on the recording medium is shown in FIG. 4A. Here, the area 6 has already been used for other data, the areas (11-1) and (11-2) are areas having the medium defect therein, and the area (5-8) is a substitution data area of the area (11-2). There is a zone boundary between areas (5-9) and (5-10). Data is in area (5-5), area (5-6), area (5-7), area (5-8), area (5-9) and area (5-10) as a result of writing in order, while the area already used for other data and the area having the medium defect are avoided.

FIG. 4B, shows the data placement table which consists of start addresses on the recording medium and the extent lengths for every data unit (extent) which is physically contiguous, i.e. is allocated contiguously from the point of physical data allocation. That is, the start address of the data recorded in area (5-5) is SA(1), and the extent length is EL(1), and then the configuration table for each extent is made by the end of the data in order. This time, the data volume in the buffer increases at the speed of (Vr−Vo), as it is shown in FIG. 4C, while the data has been read out from each data area (5-5), (5-6), (5-7), (5-8), (5-9) and (5-10), and the data volume decreases in jumping at the speed of (−Vo). Increase and decrease of this data volume in the buffer is added up for every data extent, and it is judged to be contiguous, e.g. able to reproduce seamlessly if the addition is never under zero by the end of all the data.

Still, readout interruption, called the kickback, occurs when the largest buffer capacity (Dmax) is exceeded on reading the data; the largest buffer capacity (Dmax) is a property of hardware. For example, FIG. 4C shows the kickback occurred twice. Therefore, it is desirable that whether seamless reproducing is possible or not is judged considering the effect of buffer capacity (Deff), which reduced data consumption under rotation waiting operation by this readout interruption due to the largest buffer capacity (Dmax).

Figure 5:
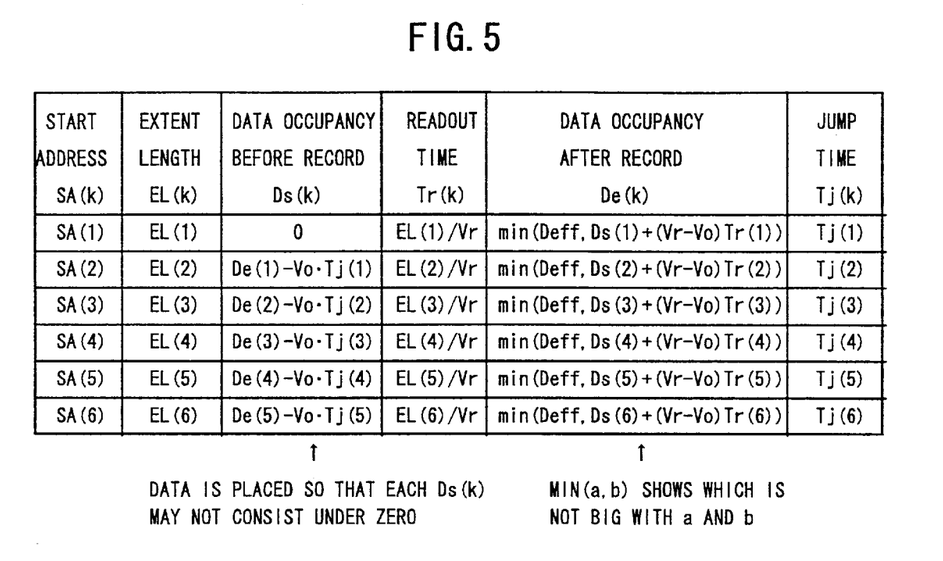
FIG. 5 shows a detailed example of a judging method.

FIG. 5 shows an example of the judging described in more detail.

To begin with, the data volume Ds(k) in the buffer before reading-out, the readout time Tr(k), and the data volume De(k) in the buffer after reading-out are calculated from the start address SA(k) and the extent length EL(k) in each data extent of the configuration table as described at FIG. 4B, and the jump time Tj(k) to next data extent is obtained. That is, first data volume (Ds(1)) in the buffer is set with zero, and the readout time Tr(1) is defined by Tr(1)=EL(1)/Vr, the data volume of De(1) in the buffer after reading-out is set to be within the effective buffer capacity Deff and Ds(1)+(Vr−Vo)·Tr(1).

This time, it becomes a worst value, if it is calculated using the maximum bit rate, when Vo is an adjustable speed bit rate (VBR). Jump time Tj(k) may use maximum revolution await time for the case in which the seek is be unnecessary, and may use the sum as the largest time required for intra-zone seek (i.e. seek within zone) and maximum revolution await time for the case in which the intra-zone seek is necessary. Jump time may use the sum as the largest time required for inter-zone seek (i.e. seek between zones) and maximum rotational frequency adjustment time and maximum revolution await time for the case in which the inter-zone seek is necessary.

Which jump time is used may be decided on the basis of the start address position around the jump. The data volume in the buffer just after jumping is equal to the data volume Ds(k) before reading-out, and data volume is calculated by Ds(k)=De(k−1)−Vo·Tj(k−1).

Like this, Ds(k) is obtained for all data extent, and it may be judged that the operation of seamless reproducing is possible, if each Ds(k) would not have a value under zero. Still, for simplicity, the value including the largest margin as the aforesaid jump time, and the time needed for the calculation by being always approximate to Ds(k)=0 in the calculation of data volume De(k) in the buffer after reading-out, may be saved.

It is judged whether the seamless reproducing operation is possible by the calculation method shown in FIG. 5, on the basis of at least four selected from extent length EL(k), data volume Ds(k) before the readout in the buffer, data readout speed Vr, data readout time Tr(k), data reproducing speed Vo, data volume De(k) in the buffer after reading-out, and jump time Tj(k) to next data contiguous unit. For example, the readout time Tr(k) can be calculated from the extent length EL(k) and the data readout speed Vr. In addition, after it is approximated that Ds(k)=0, by putting data reproducing speed Vo together, the data volume De(k) in the buffer after reading-out can be calculated.

By calculating jump time Tj(k) in addition, the data volume Ds(k+1) in the buffer before reading out the next extent is calculated. Data readout speed Vr and data reproducing speed Vo, may change in each extent, and it may be Vr(k) and Vo(k). Only the way in which changes in each Vr(k) and Vo(k) occur in every extent may be recorded on the recording medium in this case.

Figure 6:
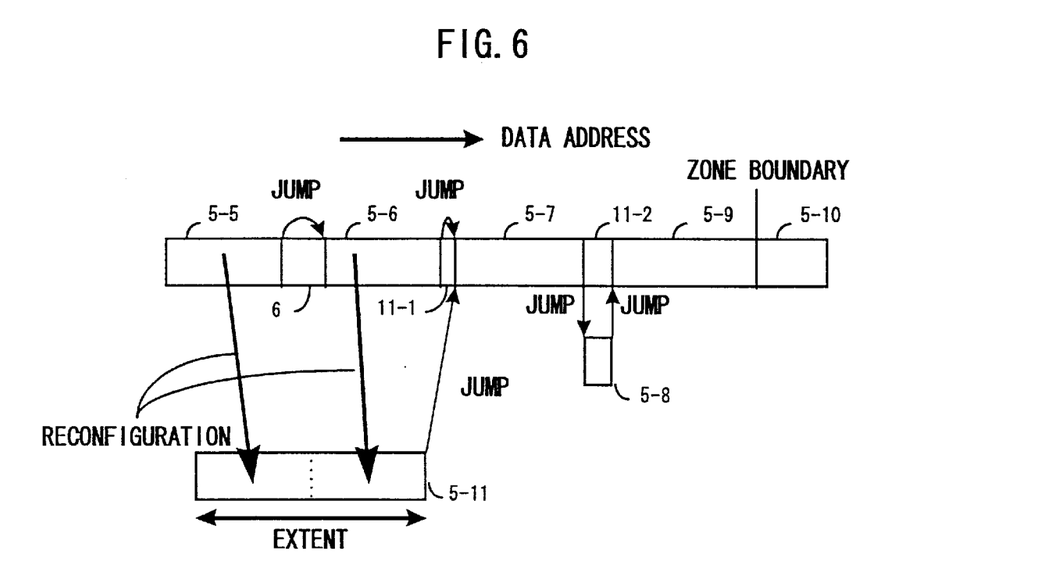
FIG. 6 shows an example of the data reconfiguration when it is judged that the contiguous or seamless reproducing is impossible.

FIG. 6 shows an example of the data reconfiguration method when judged the seamless reproducing is impossible. From FIG. 5, it is proven that increasing the value of De(k−1) is effective, and that increasing the readout time Tr(k−1), i.e. enlarging the value of EL(k−1) is effective as Ds(k) does not have a value under zero.

Therefore, data area (5-11) is newly ensured from the unused areas, for example, as shown in FIG. 6, when Ds(2) becomes under zero during the jump between the data areas (5-6) and (5-5). Data is rearranged by copying the contents of data (5-5) and (5-6) into the data area (5-11) as one extent. It may be judged that the seamless reproducing operation is possible, if the data volume Ds(k) becomes over zero after jumping from the extent (5-11) to the next extent (5-7) after reconfiguration.

Like this, the seamless reproducing operation becomes possible, if the data is rearranged so that all Ds(k) may not have a value under zero. Still, the areas (5-5) and (5-6) after reconfiguration may be open as unused areas.

Figure 7:
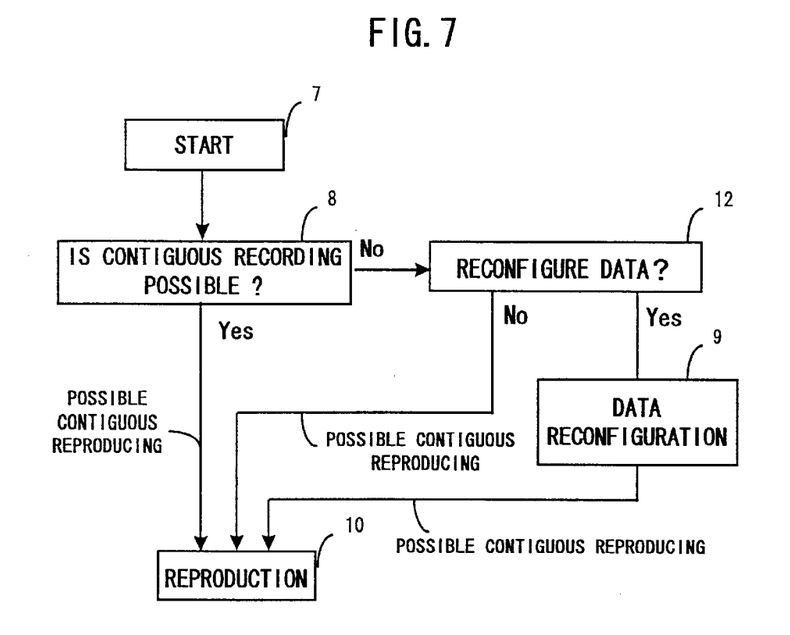
FIG. 7 shows one reconfiguration example of the embodiment of FIG. 3.

FIG. 7 shows one reformation example of the embodiment of FIG. 3. The data reconfiguration is required, as shown in FIG. 6, when it was judged seamless reproducing is impossible. The judgment of whether to rearrange the data is obtained and the message which explains the latency arising for the user is displayed so that the user may wait for hours. After starting 7, as shown in FIG. 7, decision 8 is made whether the seamless reproducing is possible or not. Judgment (12) of whether the user rearranges the data or not is required, when impossible. It takes a long time to wait on rearrangement, in the case when rearranging the data, but the seamless reproducing becomes possible in the reproducing 10. When reconfiguration of data is not required, there is no waiting, but reproducing may become discontiguous.

Figure 8:
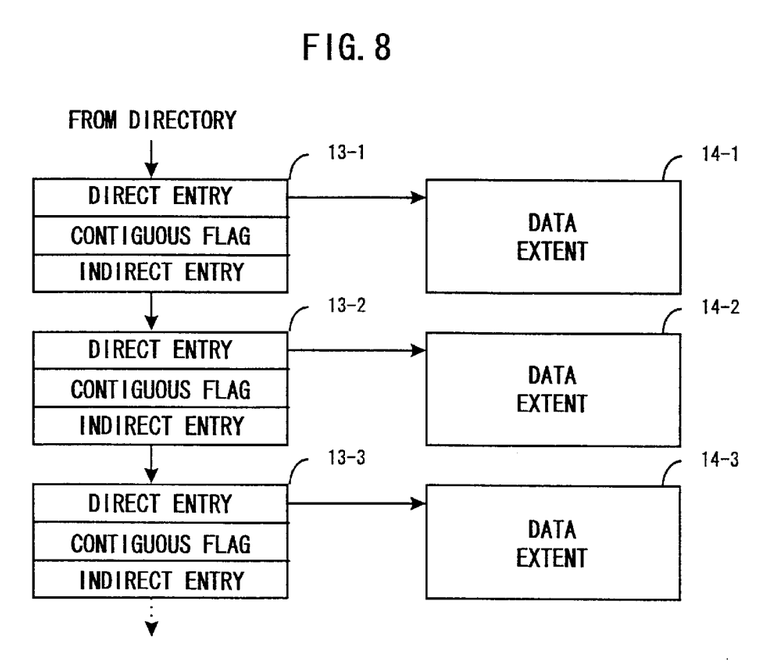
FIG. 8 shows displaying the data by one file.
Figure 9:
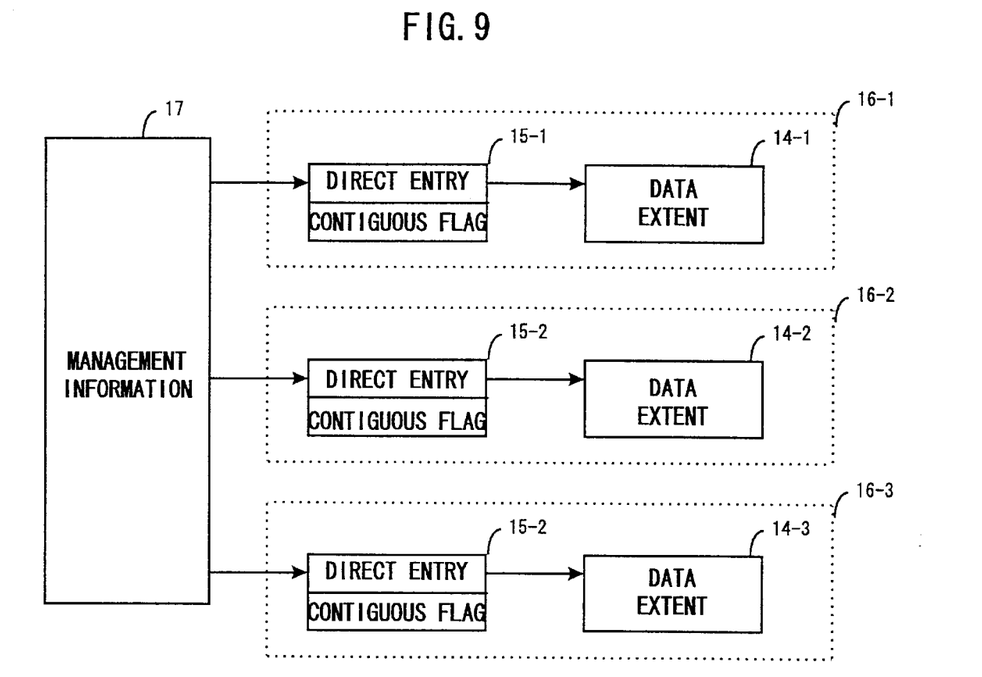
FIG. 9 shows the data defined by multiple files in every extent and those connections that are controlled by management information.

FIGS. 8 and 9 show one embodiment of this invention using the method which does not fragment the data, even if the data is copied. FIG. 8 shows a method for displaying the data by one file, and FIG. 9 shows a method in which the data are defined by multiple files in every extent and those connections that are controlled by management information.

Generally, the file on the recording medium is controlled according to the management information called ICB (Information Control Block). When it was set with ICB strategy=4096, ICB is comprised of the direct entry showing the record position in the extent, the indirect entry showing the combination to the direct entry in the next extent, and the flags which show the continuity in the extent, etc. (for example, as described in ECMA (European Computer Manufactures Association) standard No.167). To keep the contiguity in the data extent, as shown in FIG. 8, ICB 13 is added in each and every data extent 14, and the flag is set which shows the contiguity in each ICB 13 as contiguous.

Each separate file 16 has data extent 14 and ICB 15, and the flag which shows the continuity in ICB 15 in every file is set as contiguous, as shown in FIG. 9, and the connection among those files may be controlled by management information 17. Still, it is desirable to retain the name of each file 16 and reproducing order, etc. for management information 17.

Figure 10A:
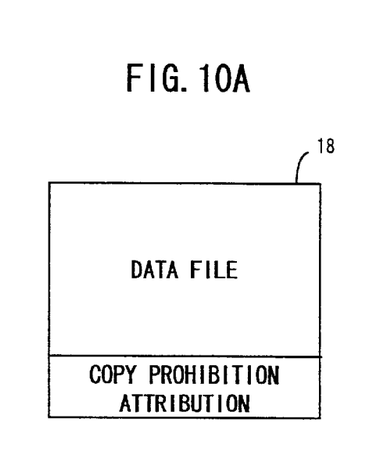
FIGS. 10A and 10B show an embodiment of this invention which forbids copying itself.
Figure 10B:
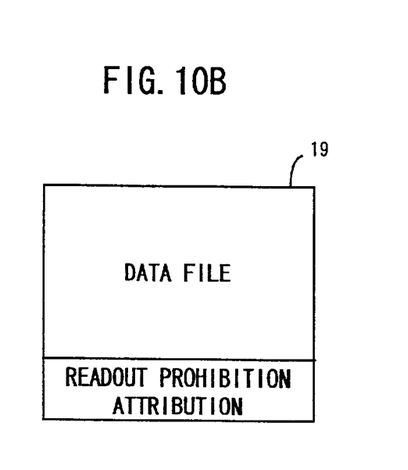

FIGS. 10A and 10B show an embodiment of this invention which forbids copy itself. FIG. 10A shows the data 18 with the copy prohibition attribution, by using CGMS (Copyright Generation Management System) described in UDF (Universal Disk Format) Revision 1.50 standards, etc. FIG. 10B shows the data 19 with the prohibition attribution, by using access permission flag (Permissions) of the description for the Standard. In the method of FIG. 10B, the copy becomes impossible by the readout prohibition, and general reproducing operation becomes impossible.

Figure 11:
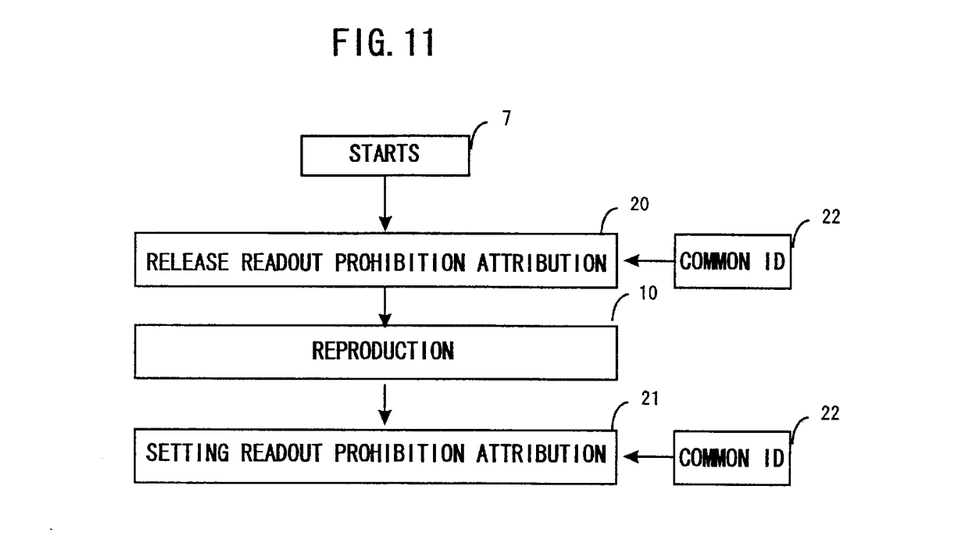
FIG. 11 shows a method for avoiding that general reproducing operation becomes impossible.

The method for avoiding this problem is explained in more detail by using FIG. 11. In FIG. 11, after starting 7, the reproducing operation 10 is performed after release 20 of the prohibition attribution by using a common discrimination name (common ID) 22 beforehand determined between each reproduction apparatus. After reproducing, by using common ID 22, again the setting 21 of the readout prohibition attribution is done, and processing is returned for the setting that it can not be copied.

Figure 12A:
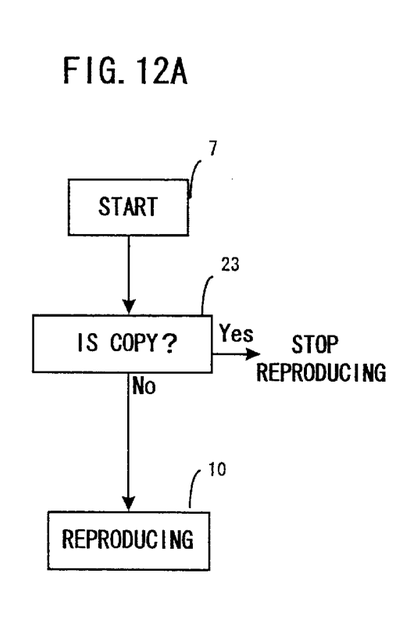
FIGS. 12A and 12B show an embodiment of this invention which judges whether the data is copied or not.

FIGS. 12A and 12B show an embodiment of this invention which judges whether the data is copied or not. In FIG. 12A, after starting 7, decision 23 is made whether the data on the recording medium is a copy or not; the usual reproducing operation 10 is performed when not being copied, and a reproducing operation is stopped in case of the copy. The decision of whether it is a copy or not in making data placement table shown at FIG. 4B, for example to be the management information, is recorded on the recording medium with the data, and it may be judged whether it agrees with actual data placement. In this case, it is judged that they are not a copy when not agreeing but they are a copy when agreeing.

Figure 12B:
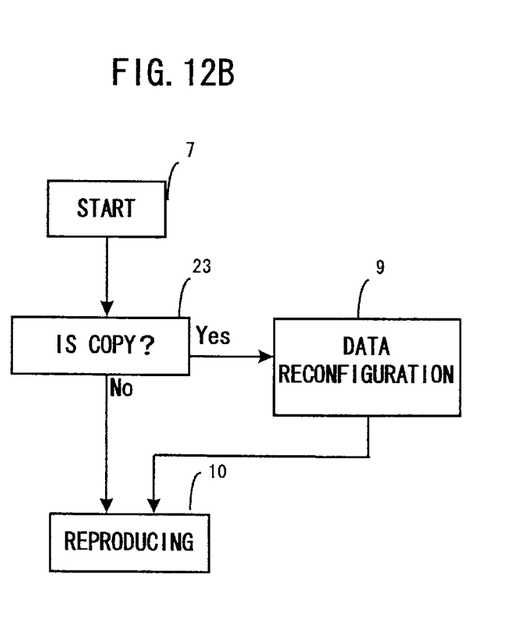

When it was judged to be a copy, as shown in FIG. 12B, after data reconfiguration 9 is done so that the contiguous reproducing may become possible by the method described in FIG. 5 and FIG. 6, the reproducing 10 may be done. Still, the message which explains the processing content for the user may be displayed when it is made to be the reproducing stop or when the data is rearranged. Though explanation was made by referring to a DVD as the rewrittable recording medium, it is clear that this invention is not limited to this and that medium and it is applicable for general recording medium.

According to this invention, the failure does not occur in a reproducing operation, when there is the danger in which the data fragmentation is generated by copying, etc.

While the present invention has been described above in conjunctions with the preferred embodiments, one of ordinary skill in the art would be enabled by this disclosure to make various modifications to these embodiments and still be within the scope and spirit of the present invention as recited in the appended claims.

According to this, invention, the failure does not occur in a reproducing operation, when there is the danger in which the data fragmentation is generated by copying, etc.

What is claimed is:

1. A method for producing data from a recording medium, which comprises the steps of:

judging whether seamless reproducing of the data is possible or not before reproduction;

starting the reproduction when said judging is that seamless reproducing is possible;

reconfiguring at least some of the data to be physically contiguous on the recording medium and then starting the reproduction of the data when said judging is that seamless reproducing is not possible; and wherein said judging is that the seamless reproducing is possible by calculating a value of data occupancy in the buffer that is never a zero value by reading the data of a contiguous unit in which the data is physically contiguously allocated from the point of physical data allocation on the recording medium, and otherwise that the seamless reproducing is not possible.

2. The method as set forth of claim 1, further comprising of the steps of:

providing data length EL(k) of each data contiguous unit, data volume Ds(k) in the buffer before reading-out, data readout speed Vr(k), data readout time Tr(k), data reproducing speed Vo(k), data volume De(k) in the buffer after reading-out and jump time Tj(k) to next contiguous data as parameters, and said judging using at least four of the parameters, when the consecutive number of the contiguous unit is k (k is a positive integer).

3. The method for producing data from a recording medium, which comprises the steps of:

judging whether seamless reproducing of the data is possible or not before reproduction;

starting the reproduction when said judging is that seamless reproducing is possible;

reconfiguring at least some of the data to be physically contiguous on the recording medium and then starting the reproduction of the data when said judging is that seamless reproducing is not possible; and wherein said judging is that the seamless reproducing is possible by calculating a value of data occupancy in the buffer that is never a zero value by reading the data of a contiguous unit in which the data is physically contiguously allocated from the point of physical data allocation on the recording medium, and otherwise that the seamless reproducing is not possible.

4. The method as set forth of claim 3, further comprising of the steps of:

providing data length $EL(k)$ of each data contiguous unit, data volume $Ds(k)$ in the buffer before reading-out, data readout speed $Vr(k)$, data readout time $Tr(k)$, data reproducing speed $Vo(k)$, data volume $De(k)$ in the buffer after reading-out and jump time $Tj(k)$ to next contiguous data as parameters, and said judging using at least four of the parameters, when the consecutive number of the contiguous unit is k (k is a positive integer).

* * * * *